United States Patent
Ihara

(10) Patent No.: US 10,078,446 B2
(45) Date of Patent: Sep. 18, 2018

(54) RELEASE REQUESTING METHOD AND PARALLEL COMPUTING APPARATUS

(71) Applicant: FUJITSU LIMITED, Kawasaki-shi, Kanagawa (JP)

(72) Inventor: Nobutaka Ihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 116 days.

(21) Appl. No.: 14/867,034

(22) Filed: Sep. 28, 2015

(65) Prior Publication Data

US 2016/0117106 A1    Apr. 28, 2016

(30) Foreign Application Priority Data

Oct. 23, 2014 (JP) ................................ 2014-215884

(51) Int. Cl.
  *G06F 3/06*    (2006.01)
  *G06F 9/54*    (2006.01)
(52) U.S. Cl.
  CPC .......... *G06F 3/0604* (2013.01); *G06F 3/0629* (2013.01); *G06F 3/0673* (2013.01); *G06F 9/54* (2013.01); *G06F 2209/548* (2013.01)
(58) Field of Classification Search
  CPC .... G06F 3/0604; G06F 3/0629; G06F 3/0673; G06F 9/54; G06F 2209/458; G06F 2209/548
  See application file for complete search history.

(56) References Cited

U.S. PATENT DOCUMENTS 5,675,737 A * 10/1997 Horie ...................... G06F 15/17
                                                                 709/212
6,430,665 B1 * 8/2002 Allison ................. G06F 12/023
                                                                 711/158

(Continued)

FOREIGN PATENT DOCUMENTS

| JP | 2007-304786 | 11/2007 |
|---|---|---|
| JP | 2008-529109 | 7/2008 |
| WO | 03/052586 A2 | 6/2003 |

OTHER PUBLICATIONS

Extended European Search Report dated Mar. 8, 2016 in corresponding European Patent Application No. 15186021.0, 8 pages.

*Primary Examiner* — Glenn Gossage
(74) *Attorney, Agent, or Firm* — Fujitsu Patent Center

(57) ABSTRACT

A processor of a parallel computing apparatus accumulates first release requests that are outputted, each of which requests releasing of a storage region that stores management information of a buffer storing data subjected to inter-process communication. Each of the first release requests includes one identifier of the storage region to be released. When the number of accumulated first release requests has reached a threshold, the processor selects first release requests, that request releasing of storage regions of management information that is not presently being used, out of the accumulated first release requests starting from a first release request with an oldest output time as first release requests to be executed. The processor then outputs a single second release request that collectively requests releasing of storage regions of management information indicated in the first release requests to be executed.

5 Claims, 11 Drawing Sheets

(56) References Cited

U.S. PATENT DOCUMENTS

| | | | |
|---|---|---|---|
| 7,770,177 B2* | 8/2010 | Togawa | G06F 9/52 |
| | | | 711/100 |
| 7,840,751 B2* | 11/2010 | Lubbers | G06F 3/061 |
| | | | 710/39 |
| 2006/0165084 A1 | 7/2006 | Makhervaks et al. | |
| 2008/0162799 A1 | 7/2008 | Spry et al. | |
| 2008/0168112 A1* | 7/2008 | Lyons | G06F 12/023 |
| 2009/0049449 A1* | 2/2009 | Varadarajan | G06F 9/5016 |
| | | | 718/104 |
| 2011/0283080 A1* | 11/2011 | Lim | G06F 12/023 |
| | | | 711/170 |
| 2014/0149994 A1* | 5/2014 | Ihara | G06F 9/522 |
| | | | 718/108 |
| 2015/0193201 A1* | 7/2015 | Mathur | H04L 47/26 |
| | | | 710/56 |
| 2015/0310900 A1* | 10/2015 | Schaub | G06T 1/20 |
| | | | 711/106 |
| 2015/0363432 A1* | 12/2015 | Perez | H04L 67/1097 |
| | | | 707/802 |
| 2016/0231946 A1* | 8/2016 | Gensler, Jr. | G06F 3/0665 |

* cited by examiner

US 10,078,446 B2

RELEASE REQUESTING METHOD AND PARALLEL COMPUTING APPARATUS

CROSS-REFERENCE TO RELATED APPLICATION

This application is based upon and claims the benefit of priority of the prior Japanese Patent Application No. 2014-215884, filed on Oct. 23, 2014, the entire contents of which are incorporated herein by reference.

FIELD

The present embodiments discussed herein are related to a release requesting method and a parallel computing apparatus.

BACKGROUND

Data is frequently transmitted and received between processes that form part of a parallel program used in high performance computing (HPC) or the like. When data is transmitted and received between processes, data regions used for transmitting and receiving the data are reserved in a user space. A buffer region for internal use by a communication library such as a message passing interface (MPI) is also reserved. During communication between processes (hereinafter, "inter-process communication"), data is transmitted and received by indicating a start address of a reserved region and an offset from the start address.

Memory regions (transmission and reception regions) reserved in a user space for inter-process communication are managed by the operating system (OS). To manage transmission and reception buffers for inter-process communication, the OS uses management tables called "steering tables" that correspond on a one-to-one basis to the reserved memory regions, for example. A network interface driver of the OS specifies transmission and reception regions being used by the user using steering tables and steering tags (or "STags") assigned to the steering tables.

When transmission and reception buffers are acquired in the user space, steering tables and STags are stored in a memory region inside a kernel space managed by the OS. When a buffer is released, the OS cancels the registration of the steering table and the STag, thereby making it possible to reuse the storage region that stored the steering table and the STag.

A number of technologies could conceivably be used to raise the efficiency of communication between host memories. One example is a technology that avoids the flow of redundant traffic onto a communication line and reduces the load of the microprocessor of the computer apparatus on the receiver side. Another example is a technology relating to an efficient iSCSI (Internet Small Computer System Interface) offload implementation using an RNIC (Remote, direct memory access enabled, Network Interface Controller).

See, for example, the following documents:

Japanese Laid-Open Patent Publication No. 2007-304786; and

Japanese National Publication of International Patent Application No. 2008-529109.

Conventionally, when transmission and reception buffers used for inter-process communication are released, the registrations of the steering tables and STags are canceled one at a time. However, there is a problem of an increase in overhead due to a registration canceling process for an STag occurring every time a buffer is released. When reusing a steering table and STag with a high usage frequency, overhead is also incurred by reregistration. For example, when canceling the registration of an STag, an overhead of 4 to 5 microseconds (μs) is taken for each system call and access to hardware. On the other hand, for simple inter-process communication, one-to-one communication takes around 1 μs. This means that the cost of canceling the registration of an Stag in order to communicate with another process is around four to five times the cost of the inter-process communication. This results in a fall in the overall efficiency of processing that involves inter-process communication.

SUMMARY

According to one aspect there is provided a non-transitory computer-readable storage medium storing a computer program, the computer program causing a computer to perform a procedure including: accumulating first release requests that are outputted, each of which requests releasing of a storage region that stores management information of a buffer storing data subjected to inter-process communication; selecting, when a number of accumulated first release requests has reached a threshold, at least some of the accumulated first release requests as first release requests to be executed; and outputting a second release request that collectively requests releasing of storage regions of management information indicated in the first release requests to be executed.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
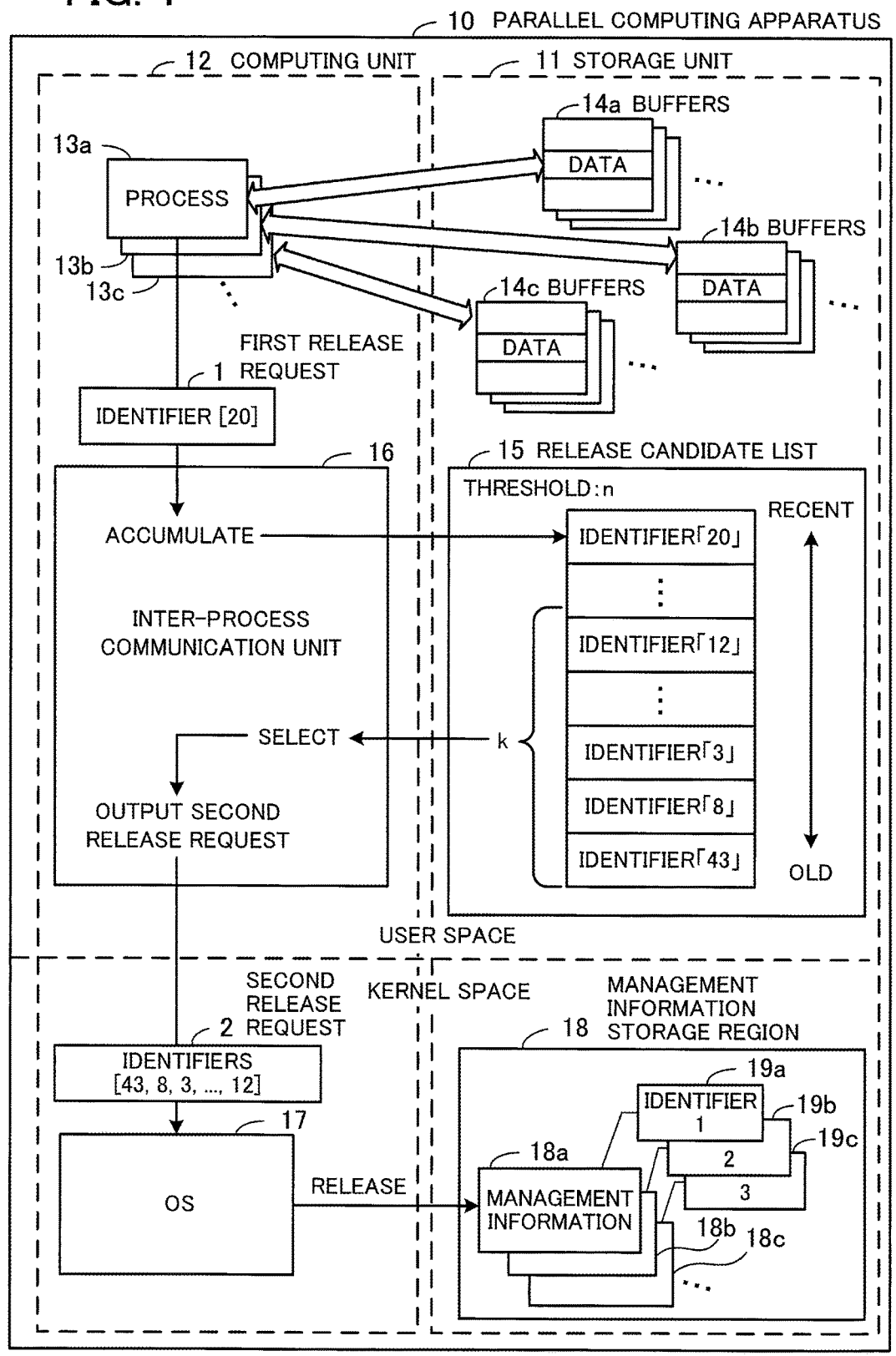
FIG. 1 depicts an example of a parallel computing apparatus according to a first embodiment.

Several embodiments will be described below with reference to the accompanying drawings, wherein like reference numerals refer to like elements throughout. Note that it is also possible to implement a plurality of the embodiments given below in combination as appropriate.

First Embodiment

The first embodiment efficiently carries out, in a parallel computing apparatus, release requests for memory regions storing management information for buffers that were reserved for inter-process communication.

FIG. 1 depicts an example of a parallel computing apparatus according to the first embodiment. A parallel computing apparatus 10 includes a storage unit 11 and a computing unit 12. The storage unit 11 is a memory, for example. The computing unit 12 is one or a plurality of processors, for example. The computing unit 12 includes a plurality of processes 13a, 13b, 13c, . . . , an inter-process communication unit 16, and an operating system (OS) 17. The plurality of processes 13a, 13b, 13c, . . . , the inter-process communication unit 16, and the OS 17 are realized for example by the computing unit 12 executing program modules.

The parallel computing apparatus 10 executes the plurality of processes 13a, 13b, 13c, . . . in parallel. The plurality of processes 13a, 13b, 13c, . . . communicate with each other via the inter-process communication unit 16. The inter-process communication unit 16 manages processing requests to the OS 17 that relate to inter-process communication. It is also possible to communicate with remote processes on other apparatuses.

When inter-process communication is carried out, communication buffers 14a, 14b, 14c, . . . are respectively reserved for the plurality of processes 13a, 13b, 13c, . . . inside the user space in the storage unit 11. The communication buffers 14a, 14b, 14c, . . . are reserved for each peer in the communication. Also, for the communication buffers 14a, 14b, 14c, . . . referred to here, a transmission buffer and a reception buffer are separately reserved.

Management information 18a, 18b, 18c, . . . is stored so as to be associated with the communication buffers 14a, 14b, 14c in a management information storage region 18 provided inside a kernel space of the storage unit 11. Information such as an address of the storage region in which the corresponding buffer is stored is set in the management information 18a, 18b, 18c, . . . . The OS 17 that operates in the kernel space uses the management information 18a, 18b, 18c, . . . to recognize the storage location of data on the transmitter side and the storage location of data on the receiver side for the inter-process communication. The management information 18a, 18b, 18c, . . . is assigned identifiers 19a, 19b, 19c . . . .

For example, when the process 13a carries out inter-process communication, data is stored in transmission buffers that are reserved for each peer. The process 13a then requests the OS 17 to transmit the data. When doing so, by designating identifiers of management information, the buffers storing the data to be transmitted and buffers that are the recipients of the data are designated. The OS 17 stores data according to RDMA (Remote Direct Memory Access) for example in reception buffers that have been reserved by processes at the recipients. After the inter-process communication ends, the process 13a outputs a first release request 1 that requests the releasing of the management information of a buffer that was used. As one example, a first release request 1 includes only one identifier of management information.

Here, if a first release request 1 were transmitted to the OS 17 every time any of the plurality of processes 13a, 13b, 13c, . . . outputs a first release request 1, the frequency of release requests to the OS 17 would increase. As a result, the overall efficiency of processing that involves inter-process communication would fall.

For the above reason, according to the first embodiment, whenever a first release request 1 is outputted, the inter-process communication unit 16 stores (accumulates) the first release request 1 in a release candidate list 15 provided in the user space of the storage unit 11. The release candidate list 15 stores the first release requests arranged in order from the first release request with the oldest output time, for example. Note that when a plurality of first release requests relating to the same management information have been outputted, only the first release request outputted last is accumulated. When the number of accumulated first release requests reaches a threshold n(where n is an integer of 1 or higher), the inter-process communication unit 16 selects at least some of the accumulated first release requests as accumulated first release requests to be executed. For example, the inter-process communication unit 16 selects the first release requests to be executed from a predetermined number k (where k is an integer such that 1·k·n) of first release requests starting from the first release request with the oldest output time. Note that the inter-process communication unit 16 is also capable of managing whether management information is being reused. When the reusing of management information is managed, the inter-process communication unit 16 selects first release requests that request the releasing of storage regions of management information that is not presently being reused as the first release requests to be executed.

Also, upon detecting that the free regions in the management information storage region 18 are about to be used up, the inter-process communication unit 16 may select the first release requests to be executed and output a second release request 2. As an example criterion, the free regions in the management information storage region 18 are about to be used up when the number of free regions in the management information storage region 18 has fallen to a predetermined number or below.

After selecting the first release requests to be executed, the inter-process communication unit 16 outputs the second release request 2, which collectively requests the releasing of the storage regions of the management information indicated in the first release requests to be executed, to the OS 17. The second release request 2 includes a plurality of identifiers of management information, for example.

Based on the second release request 2, the OS releases storage regions in which management information is stored. For example, a storage region is released when the OS 17 cancels the registration of the identifier of the management information stored in the storage region.

Note that the threshold n described above is optimally adjusted to minimize the effect of the time taken by the releasing process. When the threshold n is too low, the output frequency of second release requests increases, which limits the improvement made in the efficiency of the releasing process. On the other hand, when the threshold n is too high, the number of release candidates registered in the release candidate list 15 increases, which increases the processing load of management of release candidates in the release candidate list 15. For example, there are increases in the processing load of managing whether management information is being reused and the processing load of a determination process that determines whether a release request relating to the same management information has already been registered. For this reason, the threshold n is set at as large a value as possible within a range where the processing load of managing the release candidates does not become excessive.

In this way, in the first embodiment, when first release requests 1 have been outputted from the plurality of processes 13a, 13b, and 13c, the first release requests 1 are registered in order as release candidates in the release candidate list 15. The release candidates are then held until a number (i.e., the threshold n) of release candidates that has been optimally adjusted to minimize the effect of the time taken by the releasing process is reached. When the number of release candidates reaches the threshold n first release requests for management information that is not being reused are selected as the first release requests to be executed from a certain range of first release requests starting with the oldest. A second release request 2 that collectively requests the releasing of all of the management information indicated by the selected first release requests is then outputted to the OS 17. In response, the OS 17 releases the storage regions of the management information indicated by the second release request 2 to produce free regions. Note that when the free regions in the management information storage region 18 are about to be used up, the releasing process made via a second release request 2 is carried out regardless of whether the number of accumulated first release requests 1 has reached the threshold n.

By doing so, the frequency with which the OS 17 is requested to release management information falls and the overhead that accompany inter-process communication is reduced. In addition, since first release requests 1 for management information that is being reused are excluded from execution, it is possible to avoid a situation where management information that is reused is deleted during usage. By setting first release requests in a range of a predetermined number of first release requests in order from the oldest output time as the first release requests to be executed, first release requests with recent output times are excluded from the first release requests to be executed. As a result, management information with a high usage frequency that is used repeatedly in a short time is retained without being released, so that it is possible to avoid a situation where management information with a high usage frequency has to be newly set every time the management information is used.

Note that the lines that connect the various elements depicted in FIG. 1 illustrate only some of the communication paths and it is possible to set other communication paths aside from the illustrated paths.

Second Embodiment

Next, a second embodiment will be described. The second embodiment is an example where group communication is carried out between a plurality of nodes by an OS using steering tables as management information for transmission and reception regions.

Figure 2:
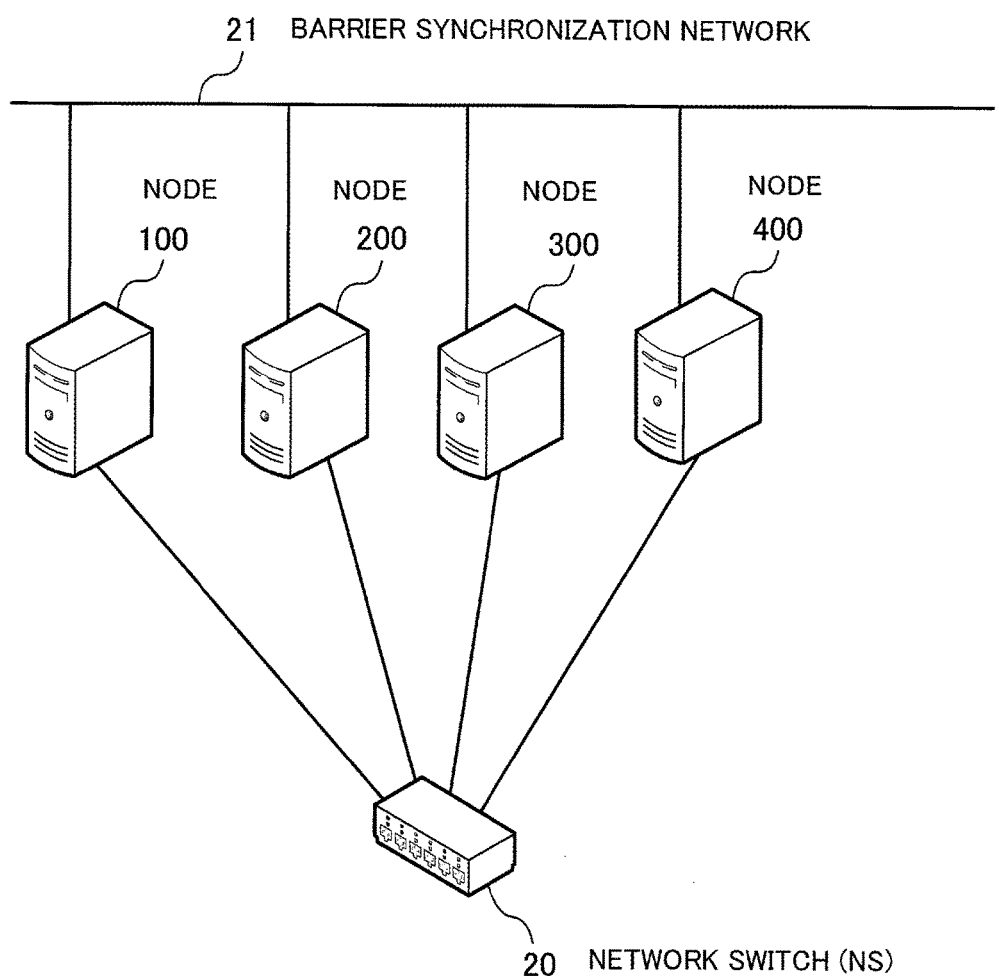
FIG. 2 depicts an example system configuration according to a second embodiment.

FIG. 2 depicts an example system configuration according to the second embodiment. As depicted in FIG. 2, a plurality of nodes 100, 200, 300, and 400 are connected via a network switch (NS) 20. The plurality of nodes 100, 200, 300, and 400 are also connected via a barrier synchronization network 21. The barrier synchronization network 21 is used for transmission and reception during communication for barrier synchronization of processes. The expression "barrier synchronization" refers to a synchronization process where processes that are executed in parallel stop at a certain location until another process reaches a predetermined location (known as the "barrier").

Figure 3:
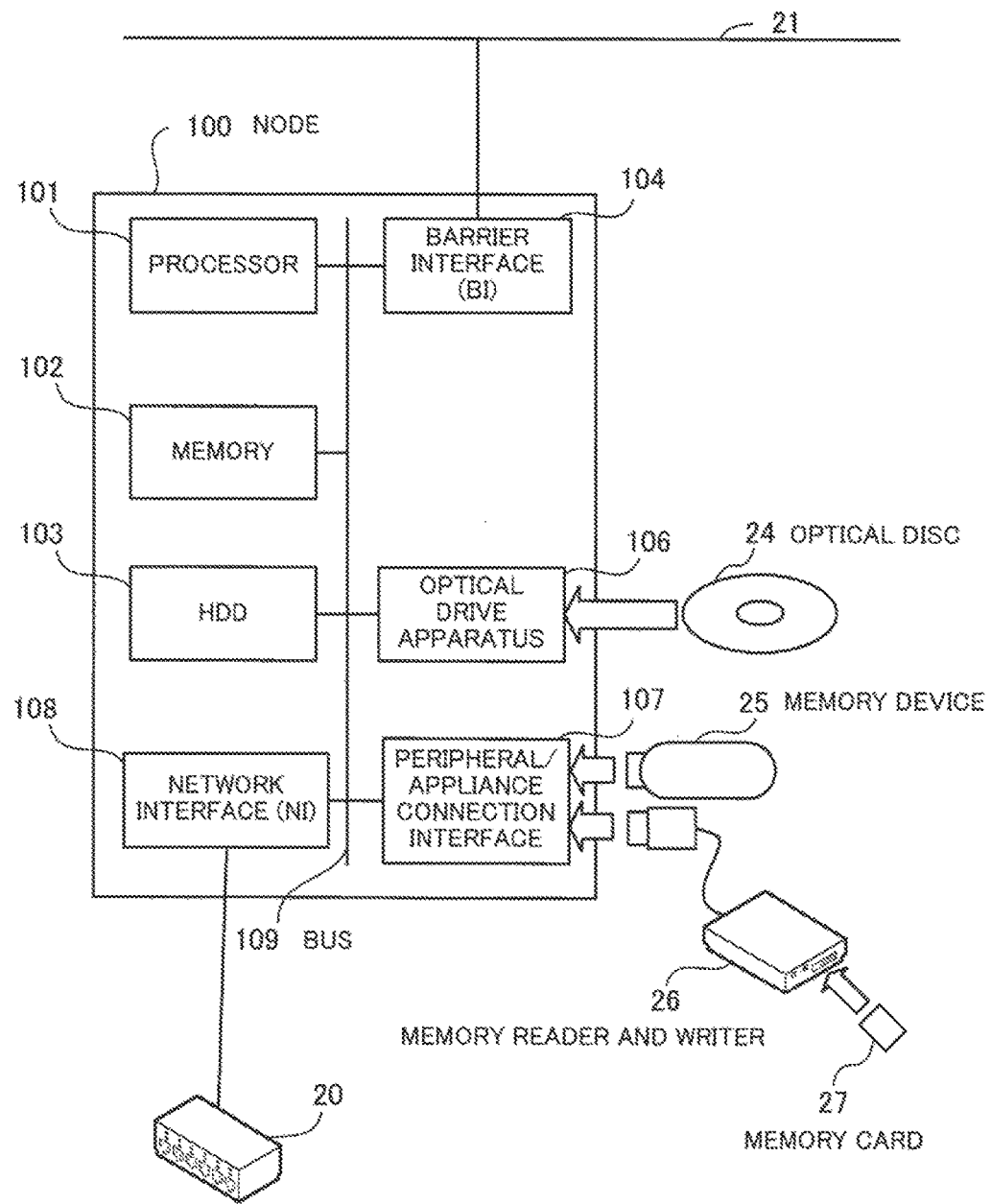
FIG. 3 depicts an example configuration of hardware of a node used in the second embodiment.

FIG. 3 depicts an example hardware configuration of a node used in the second embodiment. A processor 101 carries out overall control of the node 100. The processor 101 is connected to a memory 102 and a plurality of peripherals via a bus 109. The processor 101 may be a multiprocessor. As examples, the processor 101 is a central processing unit (CPU), a micro processing unit (MPU), or a digital signal processor (DSP). The processor 101 may be realized by an electronic circuit, such as an application-specific integrated circuit (ASIC) or a programmable logic device (PLD), whose functions are at least partially realized by executing a program.

The memory 102 is used as a main storage device of the node 100. At least some OS programs and/or application programs to be executed by the processor 101 are temporarily stored in the memory 102. Various data used in processing by the processor 101 is also stored in the memory 102. As one example, a volatile semiconductor storage device such as RAM (Random Access Memory) is used as the memory 102.

The peripherals connected to the bus 109 include a hard disk drive (HDD) 103, a barrier interface (BI) 104, an optical drive apparatus 106, a peripheral or appliance connection interface 107, and a network interface (NI) 108.

The HDD 103 magnetically reads and writes data on internally held disks. The HDD 103 is used as an auxiliary storage device of the node 100. The HDD 103 stores OS programs, application programs, and various data. Note that as an auxiliary storage device, it is also possible to use a nonvolatile semiconductor storage device such as flash memory.

The barrier interface 104 carries out communication for barrier synchronization with the other nodes 200, 300, and 400 via the barrier synchronization network 21. The optical drive apparatus 106 reads data recorded on an optical disc 24 using laser light or the like. The optical disc 24 is a portable recording medium on which data that is read using reflected light is recorded. The optical disc 24 may be a Digital Versatile Disc (DVD), a DVD-RAM, a Compact Disc Read-only Memory (CD-ROM), a CD Recordable (CD-R) or CD Rewritable (CD-RW), or the like.

The peripheral or appliance connection interface 107 is a communication interface for connecting peripherals to the node 100. For example, it is possible to connect a memory device 25 and a memory reader and writer 26 to the peripheral or appliance connection interface 107. The memory device 25 is a recording medium equipped with a function for communicating with the peripheral interface 107. The memory reader and writer 26 writes data onto a memory card 27 or reads data from the memory card 27. The memory card 27 is a card-shaped recording medium.

The network interface 108 is connected to the network switch 20. The network interface 108 transmits and receives data to and from other nodes 200, 300, and 400 via the network switch 20.

Using the hardware configuration described above, it is possible to realize the processing functions of the node 100 according to the second embodiment. It is possible to realize the other nodes 200, 300, and 400 using the same hardware as the node 100 depicted in FIG. 3. It is also possible to realize the parallel computing apparatus 10 described in the first embodiment using the same hardware as the node 100 depicted in FIG. 3.

As one example, the node 100 realizes the processing functions of the second embodiment by executing a program recorded on a computer-readable recording medium. A program in which the processing content to be executed by the node 100 is written can be recorded on a variety of recording media. For example, a program to be executed by the node 100 is stored in advance in the HDD 103. The processor 101 loads at least part of a program stored in the HDD 103 into the memory 102 and executes the program. Programs to be executed by the node 100 may also be recorded in advance on a portable recording medium such as the optical disc 24, the memory device 25, and the memory card 27. A program stored on a portable recording medium is made executable by being installed on the HDD 103 according to control from the processor 101, for example. Alternatively, the processor 101 may read and execute programs directly from a portable recording medium.

In the system described above, parallel processing is executed using the plurality of nodes 100, 200, 300, and 400. During parallel processing, processes at the respective nodes communicate with one another.

Figure 4:
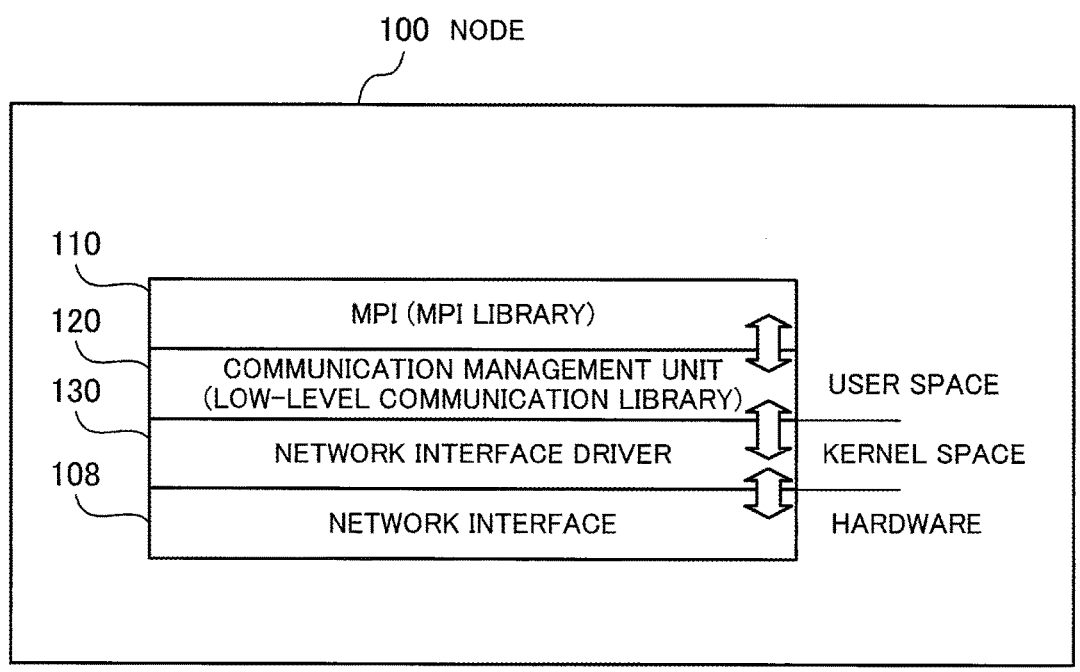
FIG. 4 depicts a communication function for inter-process communication.

FIG. 4 depicts a node and a communication function for inter-process communication. The node 100 realizes inter-process communication using an MPI 110, a communication management unit 120, a network interface driver 130, and the network interface 108. The MPI 110, the communication management unit 120, the network interface driver 130, and the network interface 108 construct a hierarchy, and requests and transfers of data are carried out between adjacent levels in the hierarchy.

The MPI 110 is a communication interface that provides a high-level inter-process communication environment for parallel processing. The MPI 110 uses the network interface 108 via the communication management unit 120 and the network interface driver 130. As one example, the MPI 110 is used by having a process that executes a user application call an MPI library. As one example, when a job is to be executed, a process that uses the MPI 110 is launched at each node and the respective processes acquire communication buffers in a memory region to communicate with each other.

The communication management unit 120 hands over communication requests that use the MPI 110 to and from the network interface driver 130 in the OS. As one example, the communication management unit 120 is used by calling a low-level communication library. The MPI 110 and the communication management unit 120 operate in a user space. The user space is a memory space where applications and the like operate. Note that the communication management unit 120 is one example of the inter-process communication unit 16 according to the first embodiment depicted in FIG. 1.

The network interface driver 130 controls the network interface 108. The network interface 108 carries out data communication with another node in accordance with instructions from the network interface driver 130. The network interface driver 130 operates in a kernel space. The kernel space is a memory space used by the OS. As one example, when a process that uses the MPI 110 has acquired a communication buffer, the network interface driver 130 prepares a steering table that uniquely corresponds to the buffer in the kernel space.

Although FIG. 4 depicts a communication function of the node 100, the same communication function is also provided in the plurality of nodes 200, 300, and 400.

Next, a specific example of inter-process communication will be described. The inter-process communication of a parallel job is based on one-to-one data communication between nodes. Here, group communication is a combination of one-to-one data communication. In one-to-one data communication between nodes, data written in a transmission buffer in a memory region of the transmitter node is written via the network interface 108 and the network switch 20 into a reception buffer in a memory region of the receiver node.

Figure 5:
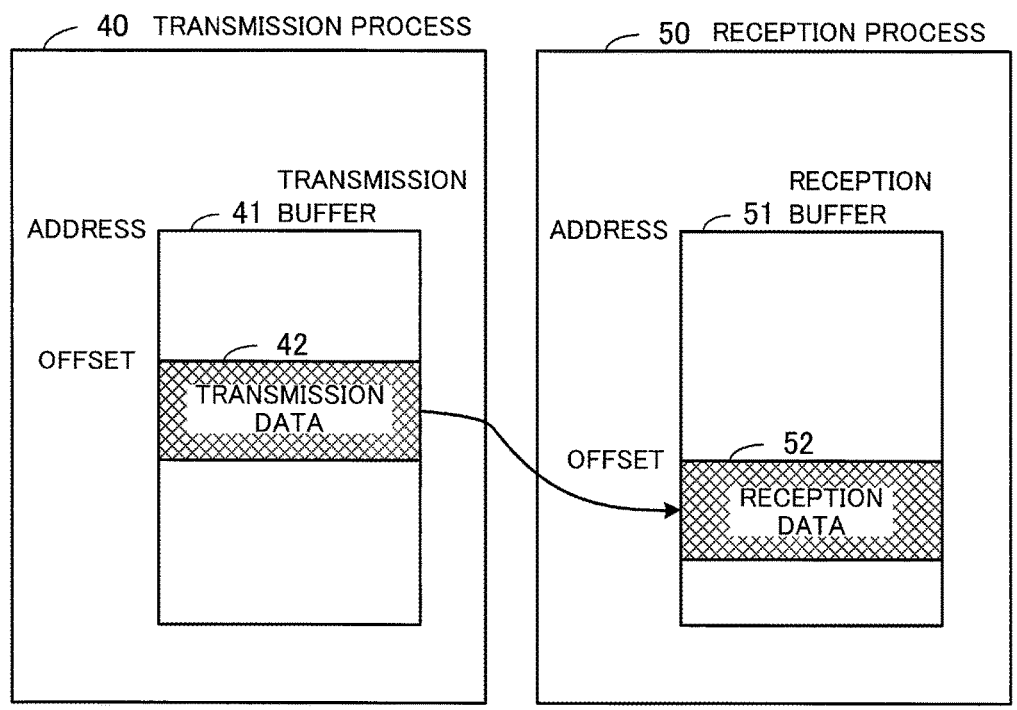
FIG. 5 depicts an example of how inter-process communication is carried out between a transmission process and a reception process.

FIG. 5 depicts an example of how inter-process communication is carried out between a transmission process and a reception process. A transmission process 40 reserves a memory region to be used as a transmission buffer 41 in a user space. A reception process 50 reserves a memory region to be used as a reception buffer 51 in a user space. A memory region is reserved according to a malloc function provided in C language, for example.

The transmission process 40 stores transmission data 42 to be transmitted to the reception process 50 in the transmission buffer 41. The transmission process 40 then transmits the transmission data 42 into the reception buffer 51. When transferring data, the transmission process 40 indicates the transmission data using a start address of the transmission buffer 41 and an offset to the transmission data 42. The transmission process 40 also indicates a storage region of data using a start address of the reception buffer 51 and an offset to a data storage region. Note that the addresses indicated by the transmission process are addresses in a virtual memory space provided for each process.

The transmitted data is stored in the reception buffer 51 as the reception data 52. The reception process then reads out the reception data 52 from the reception buffer 51 and carries out processing using the reception data 52.

Buffers are reserved in each process for each peer in the communication. For example, when a process at the node 100 transmits data to respective processes at the three other nodes 200, 300, and 400, the process at the transmitter side reserves a transmission buffer at three locations.

Note that although omitted from FIG. 5, data is transmitted from the transmission process 40 to the reception process 50 via the network interface driver 130 and the network interface 108.

Next, the steering tables and STags managed by the network interface driver 130 in the OS will be described.

Figure 6:
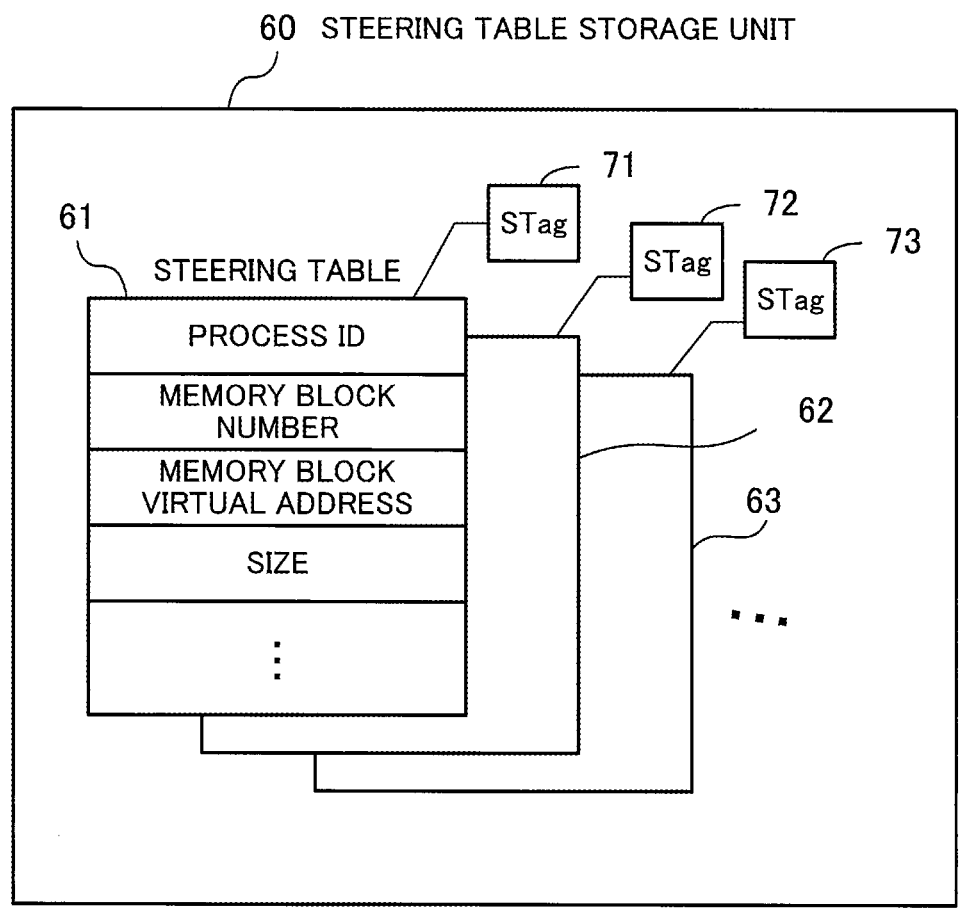
FIG. 6 depicts examples of a steering table and STags.

FIG. 6 depicts an example of a steering table storage unit storing a steering table and STags. The OS uses a memory region in the kernel space as a steering table storage unit 60 and stores steering tables 61, 62, 63, . . . in the steering table storage unit 60. The steering tables 61, 62, 63, . . . correspond on a one-to-one basis to buffers reserved in the user space. The steering tables 61, 62, 63, . . . include information such as a process ID, a memory block number, a memory block virtual address, and a size. The process ID is an identifier of the process that reserved the buffer region corresponding to the steering table. The memory block number is a block number in real memory corresponding to the buffer region reserved by the process. The memory block virtual address is a virtual address of the buffer region reserved by the process. The size is the size of the buffer region reserved by the process.

STags 71, 72, 73, . . . are assigned to the respective steering tables 61, 62, 63, . . . . The STags 71, 72, 73, . . . are identifiers of the steering tables. A process that transmits data is capable of specifying steering tables that are management information for transmission buffers using the STags 71, 72, 73, . . . . When a steering table is specified, a storage region of a transmission buffer corresponding to the steering table is also specified.

Figure 7:
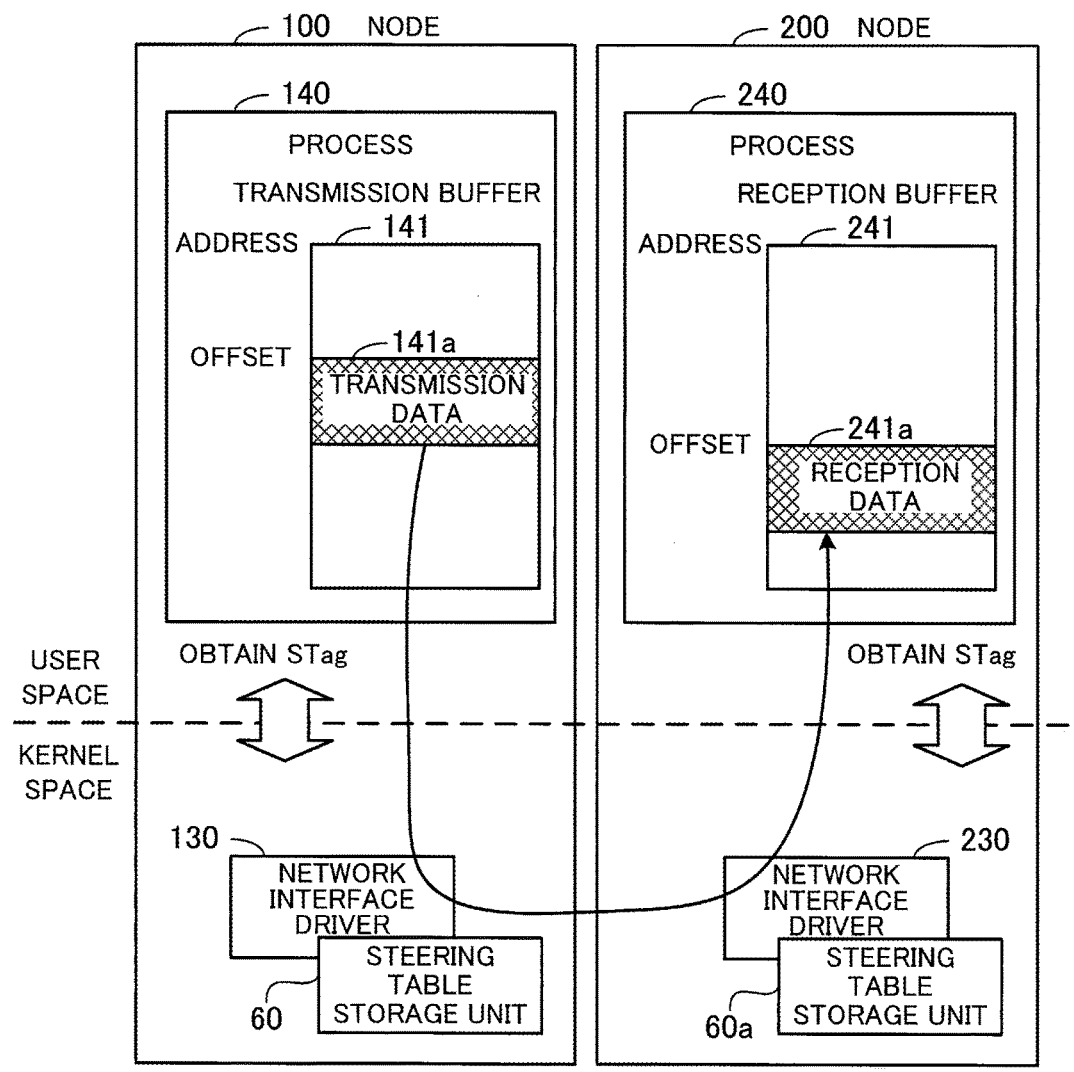
FIG. 7 depicts an example of inter-process communication using STags.

FIG. 7 depicts an example of inter-process communication using STags. In the example in FIG. 7, a process at the node 100 transmits data to a process at the node 200.

A transmission buffer 141 is reserved by a transmitter process 140 in a user space in the node 100. Transmission data is stored in the transmission buffer 141. When the process 140 at the node 100 transmits data, the process 140 requests, via the communication management unit 120, (illustrated in FIG.4), the network interface driver 130 to obtain an STag. In response, the network interface driver 130 provides a steering table in the steering table storage unit 60 and transmits the STag of the steering table to the communication management unit 120. By doing so, the transmission buffer 141 in the user space is associated on a one-to-one basis with a steering table for managing the transmission buffer 141, and the steering table is uniquely identified by an STag.

In the same way, at the node 200 on the reception side, a process 240 that receives data reserves a reception buffer 241. The process 240 then transmits an obtain request for the STag of a steering table for managing the reception buffer 241. In response, a network interface driver 230 provides a steering table in the steering table storage unit 60 and transmits the STag of the steering table to the process 240. By doing so, the reception buffer 241 in the user space is associated on a one-to-one basis with a steering table for managing the reception buffer 241, and the steering table is uniquely identified by an STag.

In accordance with a predetermined arrangement, the process 140 on the transmitter side is notified of the STag at the node 200 obtained at this time. For example, the STag obtained by the process 240 is written into a buffer indicated by an STag decided in advance between the nodes 100 and 200 and the written STag is read by the process 140 (this operation is referred to as a "get"). By doing so, the process 140 is capable of obtaining an STag that specifies the reception buffer 241 that is the transmission destination. It is also possible for the processes 140 and 240 to determine the STag to be used in advance.

Transmission data 141a is then transmitted from the node 100 to the node 200 via the network interface drivers 130 and 230 of the nodes 100 and 200. For example, the process 140 outputs a data transmission request that specifies the transmission buffer 141 and the reception buffer 241 using STags. For example, in the data transmission request, a position of the transmission data 141a is specified by an offset inside the transmission buffer 141 and a storage location of the transmitted data is specified by an offset in the reception buffer 241. The network interface driver 130 acquires the transmission data 141a from a memory region that corresponds to the indicated STag and transmits the transmission data 141a to the node 200. At the node 200, the network interface driver 230 receives the data and stores reception data 241a in the reception buffer 241 corresponding to the steering table identified by the STag.

In this way, in the inter-process communication, to manage the transmission and reception buffers prepared by processes, steering tables that uniquely correspond to the buffers are provided in the kernel space. The steering tables are managed by the network interface drivers 130 and 230 in the OS. As depicted in FIG. 6, an STag for identification purposes is assigned to each steering table. Here, when the number of peer processes with which communication is carried out increases, there is a corresponding increase in the number of buffers reserved for the peer processes in the communication. This means that when the degree of parallelism of parallel computing increases, there is an increase in the number of processes that are communication peers and an increase in the number of buffers to be acquired, which are accompanied by an increase in the number of steering tables and STags to be registered.

Note that when the number of steering tables managed by the network interface drivers 130 and 230 becomes huge, the memory capacity used in the kernel space becomes excessive, which can cause a fall in the processing efficiency of the system.

For this reason, storage regions of steering tables that are not being used are released as appropriate. A storage region of a steering table is released when the registration of corresponding STag is canceled. That is, when the registration of an STag is canceled, the registration of the steering table corresponding to the STag is also canceled and as a result, the storage region in which the steering table was stored is released.

Here, if the storage region of a steering table were released by individually deleting the registration of an STag every time a buffer region reserved for inter-process communication is no longer used and is released, this would cause an increase in overhead due to repeated execution of individual releasing processes. Further overhead would be incurred due to reregistration every time a steering table with a high usage frequency is used.

For this reason, it would be conceivable for example to hold the steering tables and STags even after the steering tables and STags are no longer used and to cancel the registration of the STags and release the storage regions of the steering tables in a single operation when the current process has ended. In this case however, when executing a parallel program with an extremely large number of processes, the number of steering tables reaches an upper limit on the number that can be stored in the steering table storage unit 60, resulting in the problem of the storage regions in which steering tables are registered being used up. When the storage regions in which steering tables are registered are used up, an error occurs for the internal processing and the process that is carrying out communication is forcibly terminated. If a process is forcibly terminated, the program being executed using the process can no longer advance.

When MPI group communication includes a complex combination of one-to-one data communication, there is a mixture of communication that always uses a different memory region (i.e., communication using a different STag every time) and communication that always uses the same memory region (i.e., communication using the same STag every time). For communication that always uses a different memory region, the registration of an STag may be canceled every time, but for communication that always uses the same memory region, it is inefficient to cancel the registration of an STag every time data communication ends.

For this reason, in this second embodiment, the communication management unit 120 registers an STag corresponding to a buffer no longer in use as a release candidate. At this time, the registration of the STag is not canceled. The communication management unit 120 confirms, when the number of release candidates has reached a certain number, whether individual STags are being reused, and transmits a release request, in which STags of the steering table that are not being used are grouped together, to the network interface driver 130. By collecting a plurality of release requests into a single request in this way, it is possible to reduce the output frequency of release requests and to improve the efficiency of the releasing process for steering tables. In addition, since the releasing process is carried out when the number of release candidates has reached a certain number, even when a large number of processes are executed in parallel, it is possible to collectively release the storage regions of unused steering tables before the free capacity of the steering table storage unit 60 is used up.

In the second embodiment, the release candidates are registered in the order in which the release candidates were requested from a process, and when the storage regions are to be collectively released, the storage regions of steering tables are released for release candidates in a certain range starting from the oldest candidate. By doing so, STags that have recently become release candidates are held without the registration of the STags being canceled. That is, since buffers that have only recently become unused have a higher probability of being reused than buffers that have been unused for a long time, the corresponding steering tables are excluded from being released. By doing so, the canceling of registration of Stags with a high usage frequency is avoided and a drop in processing efficiency due to frequent execution of a re-registration process is avoided. By optimally adjusting the number of Stags accumulated as release candidates, it is possible to reduce the number of times the canceling of registrations is carried out and to avoid the overhead produced by frequent canceling of registrations.

In the second embodiment, canceling of the registrations of STags is also carried out when the free capacity of the steering table storage unit 60 is about to be used up. By doing so, a situation where the free capacity of the steering table storage unit 60 becomes used up is more reliably avoided.

Figure 8:
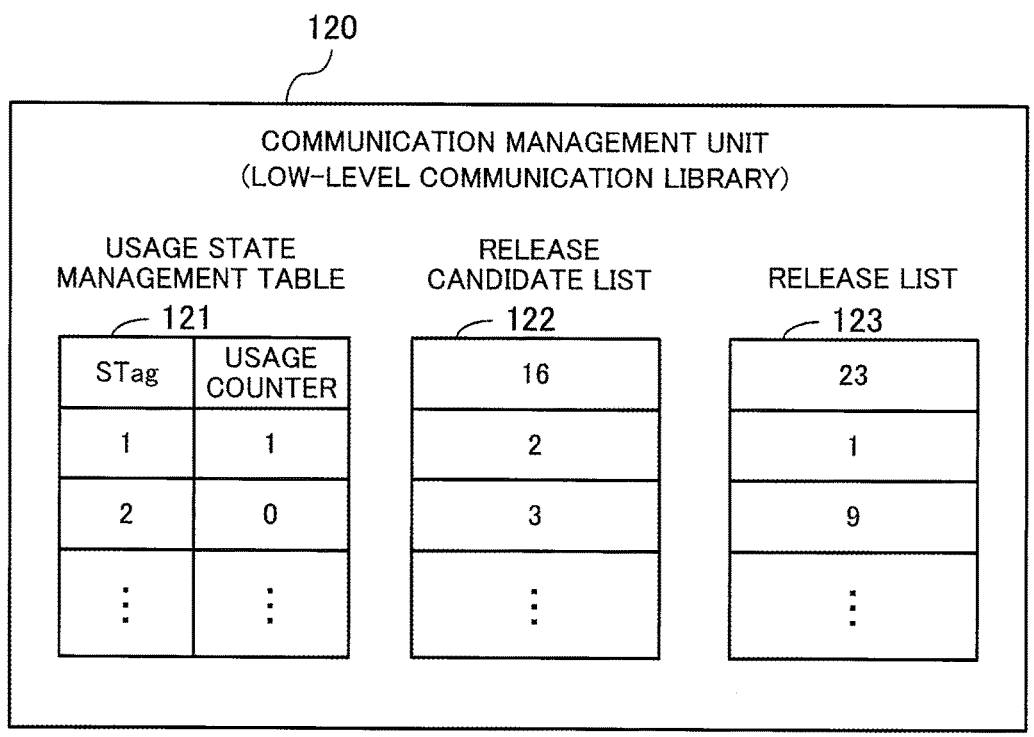
FIG. 8 depicts information held by a communication management unit to manage a collective releasing of STags.

FIG. 8 depicts information held by the communication management unit to manage the collective releasing of STags. The communication management unit 120 stores a usage state management table 121, a release candidate list 122, and a release list 123 in a memory in the user space.

The usage state management table 121 is a data table relating to the usage state of a buffer corresponding to an STag. In the usage state management table 121, a value of a usage counter is set so as to be associated with a value of an STag. The usage counter is incremented by one every time an STag is used and decremented by one every time a use of the STag ends. An STag where the value of the usage counter is zero is no longer in use.

The release candidate list 122 is a list of STags that are release candidates. Every time a data transfer for inter-process communication that uses a buffer is completed, the value of the STag corresponding to the buffer is registered in the release candidate list 122. In the release candidate list 122, the higher an STag is registered, the older the release candidate (i.e., the longer the time since the STag became a release candidate).

The release list 123 is a list of target STags when collective releasing is carried out. By transmitting a release request that indicates all of the STags registered in the release list 123 to the network interface driver 130, a plurality of STags are collectively released.

Next, an STag enquiry process carried out by the communication management unit 120 to enquire to the network interface driver 130 will be described.

Figure 9:
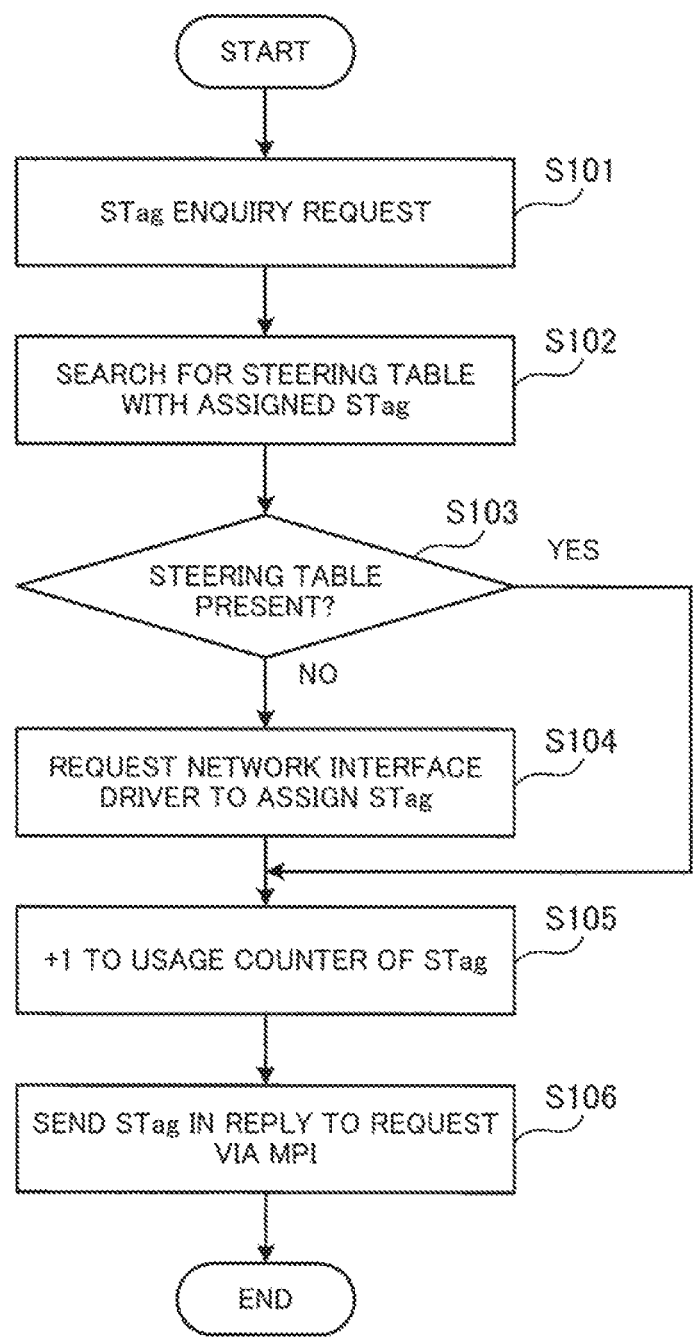
FIG. 9 is a flowchart showing an example procedure of an STag enquiry process.

FIG. 9 is a flowchart depicting an example procedure of the STag enquiry process.

In step S101, the communication management unit 120 receives, from a process via the MPI 110, an enquiry request for an STag associated with a buffer for transmitting and receiving data. The enquiry request includes a virtual address of a buffer, for example.

In step S102, the communication management unit 120 searches the steering table storage unit 60 for a steering table corresponding to the buffer indicated in the enquiry request. For example, the communication management unit 120 compares a memory block virtual address of each steering table in the steering table storage unit 60 with a virtual address indicated in the enquiry request to search for a matching steering table.

In step S103, if there is a matching steering table, the communication management unit 120 advances the processing to step S105. If there is no matching steering table, the processing advances to step S104.

In step S104, the communication management unit 120 requests the network interface driver 130 to assign an STag. In response, at the network interface driver 130, an unused steering table in the steering table storage unit 60 is assigned to the buffer indicated by the enquiry request and an STag is assigned to the steering table. The assigned STag is transmitted from the network interface driver 130 to the communication management unit 120. Note that information relating to the storage region of the buffer reserved by the process that outputted the enquiry request is set in the steering table assigned the STag.

In step S105, the communication management unit 120 adds one to the usage counter of the STag of the buffer in the enquiry request in the usage state management table 121.

In step S106, the communication management unit 120 sends the STag as a reply to the enquiry request made via the MPI 110. In this way, when there is an enquiry for an STag corresponding to a buffer, the usage counter of the STag is incremented.

Next, the registration canceling procedure for STags will be described. The canceling of the registrations of STags is carried out in two situations, that is, when a predetermined number of release candidates or more have been accumulated, and when there are no more usable steering tables. The procedure for each situation will now be described.

Figure 10:
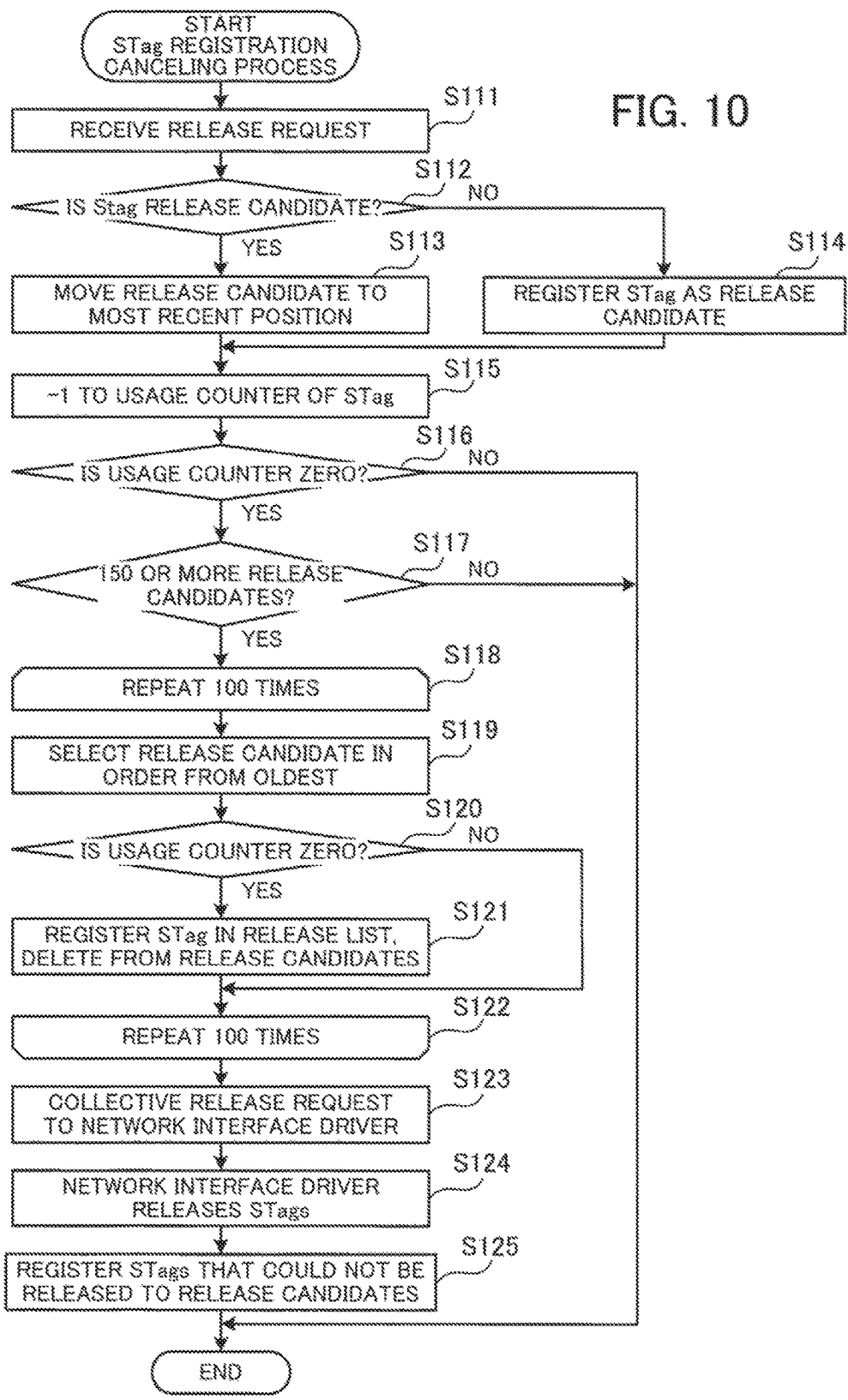
FIG. 10 is a flowchart depicting a first example of the procedure of a registration canceling process for STags.

FIG. 10 is a flowchart depicting a first example of the procedure of the registration canceling process for STags. In the first example, the registrations of STags are canceled when a predetermined number of release candidates or more have been accumulated.

In step S111, the communication management unit 120 receives a release request that indicates an STag from a process via the MPI 110.

In step S112, the communication management unit 120 determines whether the STag indicated in the release request is a release candidate. For example, the communication management unit 120 searches the release candidate list 122 for the STag indicated in the release request. If a corresponding STag is present in the release candidate list 122, it is determined that the STag has already been set as a release candidate. If the STag is a release candidate, the processing advances to step S113. If the STag is not a release candidate, the processing advances to step S114.

In step S113, the communication management unit 120 moves the STag of the corresponding release candidate in the release candidate list 122 to a position that is the newest release candidate. Moving a release candidate in this way is the same as leaving only an Stag corresponding to the most recent release request in the release candidate list 122 when release requests that indicate the same STag have been outputted a plurality of times. The processing then advances to step S116.

In step S114, the communication management unit 120 registers the STag indicated in the release request as the newest release candidate in the release candidate list 122.

In step S115, the communication management unit 120 subtracts one from the value of the usage counter of the STag indicated in the release request in the usage state management table 121.

In step S116, the communication management unit 120 determines whether the value of the usage counter of the STag is zero. When the value of the usage counter is zero, the steering table corresponding to the STag is not being used. When the value of the usage counter is zero, the processing advances to step S117. When the value of the usage counter is not zero, the STag releasing process ends.

In step S117, the communication management unit 120 determines whether the number of STags registered as release candidates in the release candidate list 122 is a predetermined number (for example, 150) or more. When the number of release candidates is a predetermined number or more, the processing advances to step S118. When the number of release candidates is fewer than the predetermined number, the STag releasing process ends.

In step S118, the communication management unit 120 counts the number of iterations of the processing in steps S119 to S121 and repeats the processing one hundred times, for example.

In step S119, the communication management unit 120 selects a release candidate in the release candidate list 122 in order from the oldest release candidate.

In step S120, the communication management unit 120 refers to the usage state management table 121 and determines whether the value of the usage counter of the selected release candidate (STag) is zero. When the value of the usage counter is zero, the processing advances to step S121. When the value of the usage counter is not zero, this means that the steering table corresponding to the release candidate is being reused, and therefore the release candidate is kept and the processing advances to step S122.

In step S121, the communication management unit 120 registers the selected STag in the release list 123 and deletes the STag from the release candidate list 122.

In step S122, when steps S119 to S121 have been repeated one hundred times, the communication management unit 120 advances the processing to step S123. If the number of iterations has not reached one hundred, steps S119 to S121 are repeated.

In step S123, the communication management unit 120 transmits a collective release request for the STags registered in the release list 123 to the network interface driver 130.

In step S124, in accordance with the release request, the network interface driver 130 collectively cancels the registrations of the Stags registered in the release list 123. That is, the registrations of the steering tables assigned the STags whose registrations have been canceled are canceled at the same time and the storage regions in which the steering tables were stored are released. The released storage regions are treated as free regions. If there are STags that could not be released, the network interface driver 130 informs the communication management unit 120 of the STags.

In step S125, the communication management unit 120 registers the STags that could not be released in the release candidate list 122 as release candidates. At this time, the STags registered in the release list 123 are all deleted.

In this way, when a predetermined number of release candidates or more have been accumulated, it is possible to request the releasing of the storage regions of corresponding steering tables collectively for a plurality of STags. By doing so, the release requests to the network interface driver 130 are transmitted less frequently and the efficiency of processing that involves the releasing of storage regions of steering tables is improved.

Figure 11:
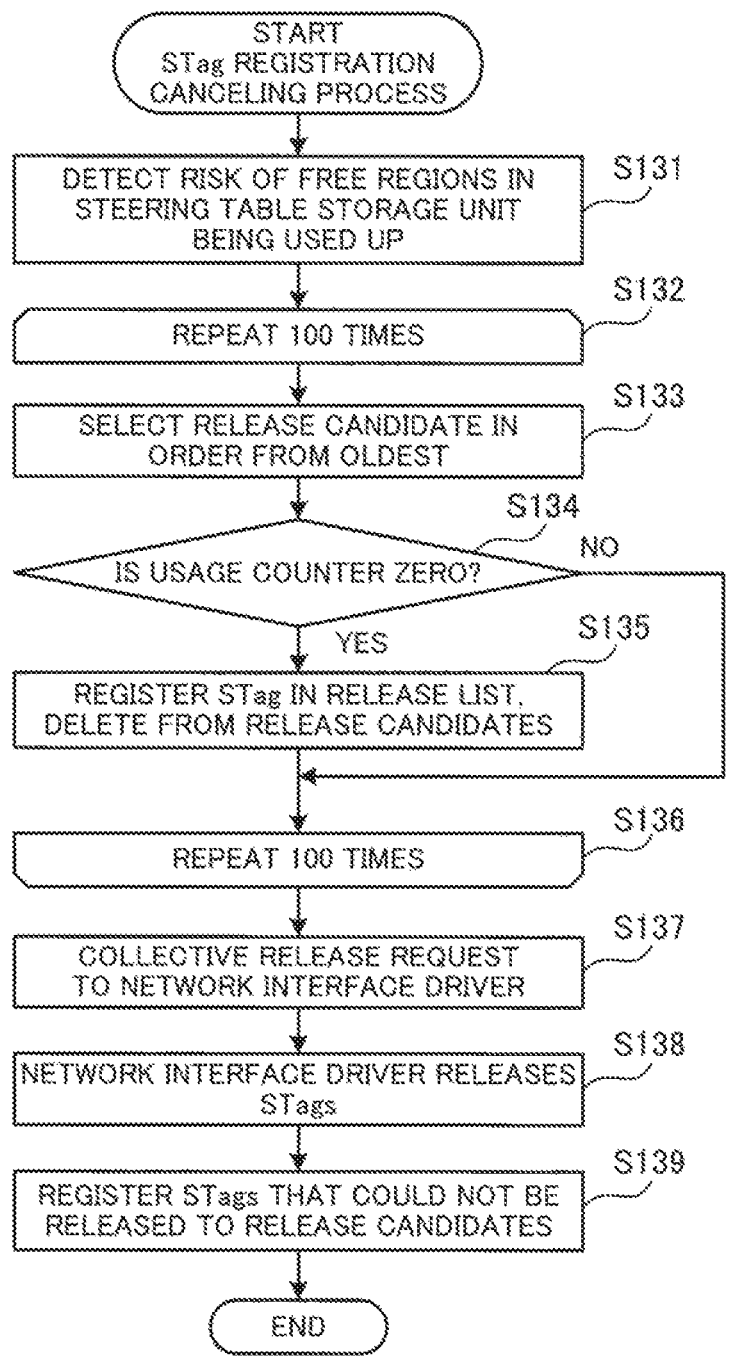
FIG. 11 is a flowchart depicting a second example of the procedure of the registration canceling process for STags.

FIG. 11 is a flowchart depicting a second example procedure of the registration releasing process for STags. In the second example, the registration of STags is deleted when a predetermined number of release candidates or more have been accumulated. In the processing depicted in FIG. 11, steps S132 to S139 are similar to steps S118 to S125 depicted in FIG. 10. The only difference is in step S131.

In step S131, the communication management unit 120 detects whether there is a risk of free regions in the steering table storage unit 60 being used up. For example, the communication management unit 120 regularly confirms the number of steering tables that can be newly used. If the maximum number of steering tables is decided in advance, the difference between the maximum number and the number of steering tables that are presently assigned an STag is the number of steering tables that can be newly used. When the number of steering tables that can be newly used is a predetermined number or fewer, the communication management unit 120 determines that there is a risk of the steering tables that can be newly used being used up. On determining that there is a risk of the steering tables that can be newly used being used up, the communication management unit 120 executes steps S132 to S139.

In this way, before the free regions of the steering table storage unit 60 are used up, the collective canceling of the registrations of a plurality of STags is requested and storage regions storing steering tables that are already present are released. For example, even in a state where the number of release candidates is low (below 150), when an acquisition process for a steering table frequently occurs and the free regions of the steering table storage unit 60 appear to be insufficient, the registrations of steering tables that are unused at that time are deleted to release the storage regions. By doing so, it is possible to avoid a situation where the free regions of the steering table storage unit 60 become used up and it is no longer possible to set a new steering table.

In this way, it is possible to transmit a plurality of release requests collectively as a single request to the network interface driver in the OS and to reduce the number of transmissions of release requests. When the number of transmissions of release requests is reduced, the overhead that accompanies release requests is reduced and the processing efficiency of inter-process communication is improved.

As one example, when canceling the registration of an STag, an overhead of 4 to 5 μs is taken for each system call and access to hardware. On the other hand, one-to-one communication takes around 1 μs, which means that canceling the registration of an STag every time communication is performed incurs four to five times the overhead of communication. One-to-one communication is carried out 150 times until 150 release candidates have been accumulated. The time taken by carrying out communication 150 times is 1 μs multiplied by 150, which is 150 μs. The influence of the release canceling time on the entire processing relating to inter-process communication is therefore reduced to around 2 to 4%.

Although embodiments have been described above, it is possible to replace the respective constructions given in the embodiments with other constructions with the same functions. Other constructions and processes may also be added. In addition, two or more constructions or characteristics given in the embodiments may be combined into a single element.

According to the embodiments, it is possible to improve the efficiency of processing that involves inter-process communication.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a procedure comprising:

accumulating first release requests that are outputted, each of which requests releasing of a storage region that stores management information of a buffer storing data subjected to inter-process communication, the first release requests each including one identifier of the storage region to be released, the storage region to be released being associated with a usage counter which is incremented by one every time management information stored in the storage region to be released is used and decremented by one every time a use of the management information stored in the storage region to be released ends;

selecting, when a number of accumulated first release requests has reached a threshold, a predetermined number of first release requests out of the accumulated first release requests starting from a first release request with an oldest output time as first release requests to be executed, the first release requests to be executed respectively requesting releasing of first storage regions which are each associated with a usage counter whose value is zero; and outputting a single second release request that collectively requests releasing of the first storage regions indicated in the first release requests to be executed, the single second release request including a plurality of identifiers of the first storage regions to be released.

2. The computer-readable storage medium according to claim 1, wherein when a plurality of first release requests relating to the same management information have been outputted, only the first release request relating to the same management information that was outputted most recently is accumulated.

3. The computer-readable storage medium according to claim 1, wherein the procedure performed by the computer further comprises selecting, when a number of free regions for storing management information is a predetermined number or fewer, at least some of the accumulated first release requests as the first release requests to be executed.

4. A release requesting method comprising:

accumulating, by a processor, first release requests that are outputted, each of which requests releasing of a storage region that stores management information of a buffer storing data subjected to inter-process communication, the first release requests each including one identifier of the storage region to be released, the storage region to be released being associated with a usage counter which is incremented by one every time management information stored in the storage region to be released is used and decremented by one every time a use of the management information stored in the storage region to be released ends;

selecting, by the processor and when a number of accumulated first release requests has reached a threshold, a predetermined number of first release requests out of the accumulated first release requests starting from a first release request with an oldest output time as first release requests to be executed, the first release requests to be executed respectively requesting releasing of first storage regions which are each associated with a usage counter whose value is zero; and outputting, by the processor, a single second release request that collectively requests releasing of the first storage regions indicated in the first release requests to be executed, the single second release request including a plurality of identifiers of the first storage regions to be released.

5. A parallel computing apparatus comprising:

a memory storing management information of buffers storing data subjected to inter-process communication; and a processor performing a procedure including:

accumulating first release requests that are outputted, each of which requests releasing of a storage region that stores management information of a buffer storing data subjected to inter-process communication, the first release requests each including one identifier of the storage region to be released, the storage region to be released being associated with a usage counter which is incremented by one every time management information stored in the storage region to be released is used and decremented by one every time a use of the management information stored in the storage region to be released ends;

selecting, when a number of accumulated first release requests has reached a threshold, a predetermined number of first release requests out of the accumulated first release requests starting from a first release request with an oldest output time as first release requests to be executed, the first release requests to be executed respectively requesting releasing of first storage regions which are each associated with a usage counter whose value is zero; and outputting a single second release request that collectively requests releasing of the first storage regions of management information indicated in the first release requests to be executed, the single second release request including a plurality of identifiers of the first storage regions to be released.

* * * * *